United States Patent
Kono et al.

(12) 
(10) Patent No.: US 6,569,795 B2
(45) Date of Patent: May 27, 2003

(54) HIGH FREQUENCY DIELECTRIC CERAMIC COMPACT, DIELECTRIC RESONATOR, DIELECTRIC FILTER, DIELECTRIC DUPLEXER, AND COMMUNICATION APPARATUS

(75) Inventors: Mizuki Kono, Yokaichi (JP); Tsutomu Tatekawa, Otsu (JP); Hitoshi Takagi, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 135 days.

(21) Appl. No.: 09/894,063

(22) Filed: Jun. 28, 2001

(65) Prior Publication Data

US 2002/0021188 A1 Feb. 21, 2002

(30) Foreign Application Priority Data

Jul. 3, 2000 (JP) ......................................... 2000-201160

(51) Int. Cl.$^7$ ..................... C04B 35/01; C04B 35/468; H01B 1/201
(52) U.S. Cl. ..................... 501/135; 501/135; 501/137; 501/138; 501/139; 333/202; 333/206; 333/222
(58) Field of Search ................................ 501/135, 137, 501/138, 139; 333/202, 206, 222

(56) References Cited

U.S. PATENT DOCUMENTS 6,117,806 A * 9/2000 Yokoi et al. ................ 501/135

FOREIGN PATENT DOCUMENTS

| JP | 58-25068 | 5/1983 |
| JP | 58-166608 | 10/1983 |
| JP | 3-34164 | 5/1991 |

* cited by examiner

*Primary Examiner*—Karl Group
(74) *Attorney, Agent, or Firm*—Dickstein, Shapiro, Morin & Oshinsky, LLP

(57) ABSTRACT

A high-frequency dielectric ceramic compact is provided which has a relative dielectric constant ($\epsilon_r$) of about 20 or less and a Q value of about 20,000 or more at 1 GHz, in which the temperature coefficient ($\tau_f$) can be optionally controlled at about 0 (ppm/° C.). When the compact of the dielectric ceramic compact is represented by the formula $aBaO \cdot bMeO \cdot cSbO_{3/2}$, $0.476 \leq a \leq 0.513$, $0.160 \leq b \leq 0.175$, and $0.324 \leq c \leq 0.350$. In addition, when the compact of the dielectric ceramic compact is represented by the formula $dBaO \cdot eMeO \cdot fSbO_{3/2} \cdot gTiO_2$, $0.476 \leq d \leq 0.513$, $0.100 \leq e \leq 0.175$, $0.200 \leq f \leq 0.349$, and $0 < g \leq 0.200$.

21 Claims, 3 Drawing Sheets

HIGH FREQUENCY DIELECTRIC CERAMIC COMPACT, DIELECTRIC RESONATOR, DIELECTRIC FILTER, DIELECTRIC DUPLEXER, AND COMMUNICATION APPARATUS

BACKGROUND OF THE INVENTION

1. Field of the Invention

The present invention relates to high-frequency dielectric ceramic compacts for dielectric resonators, dielectric antennas, LC filters, circuit substrates and the like, used in high frequency regions, such as microwaves and millimeter waves. In addition, the present invention relates to a dielectric resonator, a dielectric filter, a dielectric duplexer and a communication apparatus using the high-frequency dielectric ceramic compact.

2. Description of the Related Art

Dielectric ceramics are being widely used for dielectric resonators, circuit substrates and the like, in high frequency regions such as microwaves.

A material used for dielectric resonators, circuit substrates and the like, is required to have the following dielectric characteristics, that is, (1) a high relative dielectric constant ($\epsilon_r$) in response to trend toward miniaturization since the wavelengths of electromagnetic waves in a dielectric material are shortened to $1/(\epsilon_r)^{1/2}$, (2) a small dielectric loss, that is, a high Q value, (3) stable temperature dependence of the resonant frequency, that is, the temperature coefficient ($\tau_f$) of the resonant frequency is nearly 0 (ppm/° C.), and the like.

In the recent trend toward higher frequency and higher speed in information transmission, millimeter waves tend to be used instead of microwaves. Accordingly, the devices are becoming increasingly miniaturized, and in view of processing accuracy and better workability in manufacturing, the (1) requirement described above is slightly changed in that a material having an even lower relative dielectric constant is increasingly demanded while maintaining a high Q value and stable temperature dependence of the resonant frequency.

As a dielectric ceramic compact having a relatively low relative dielectric constant, for example, there may be mentioned a $MgTiO_3$—$CaTiO_3$-based ceramic (Japanese Unexamined Patent Application Publication No. 58-166608), a $Ba(Zn,Ta)O_3$-based ceramic (Japanese Examined Patent Application Publication No. 58-25068), a $Ba(Sn,Mg,Ta)$-based ceramic (Japanese Examined Patent Application Publication No. 3-34164) and an $Al_2O_3$ ceramic.

However, in the $MgTiO_3$—$CaTiO_3$-based, $Ba(Zn, Ta)O_3$-based, and $Ba(Sn, Mg, Ta)$-based material, the temperature coefficient ($\tau_f$) of the resonant frequency can be controlled to be 0, but the relative dielectric constant ($\epsilon_r$) is relatively high, such as 20 to 30.

On the other hand, the relative dielectric constant ($\epsilon_r$) in an $Al_2O_3$-based material is low such as approximately 10, and the Q value is high such as 400,000 to 500,000 at 1 GHz; however, the temperature coefficient ($\tau_f$) of the resonant frequency is a significant negative value, such as −40.

SUMMARY OF THE INVENTION

An object of the present invention is to provide a high-frequency dielectric ceramic compact which can solve the problems described above and which has a relative dielectric constant ($\epsilon_r$) of about 20 or less and a Q value of about 20,000 or more at 1 GHz, in which the temperature coefficient ($\tau_f$) of the resonant frequency can be controlled optionally about 0 (ppm/° C.). In addition, another object of the present invention is to provide a dielectric resonator, a dielectric filter, a dielectric duplexer, and a communication apparatus using the high-frequency dielectric ceramic compact described above.

To these ends, a high-frequency dielectric ceramic compact of the present invention comprises Ba, Sb and Me which comprises Mg or Mg and at least one of Zn, Ni, and Co, wherein, when the compact is represented by the formula $aBaO \cdot bMeO \cdot cSbO_{3/2}$ on a molar basis, the following equations hold: $0.476 \leq a \leq 0.513$, $0.160 \leq b \leq 0.175$, and $0.324 \leq c \leq 0.350$.

In the high-frequency dielectric ceramic compact described above, the primary crystalline phase is a perovskite crystal represented by the formula $Ba(Me_{1/3}Sb_{2/3})O_3$, in which Me comprises Mg or Mg and at least one of Zn, Ni and Co.

In addition, a high-frequency dielectric ceramic compact of the present invention comprises Ba, Sb, Ti and Me in which Me comprises Mg or Mg and at least one of Zn, Ni and Co, wherein, when the compact is represented by the formula $dBaO \cdot eMeO \cdot fSbO_{3/2} \cdot gTiO_2$ on a molar basis, the following equations hold: $0.476 \leq d \leq 0.513$, $0.100 \leq e \leq 0.175$, $0.200 \leq f \leq 0.349$, and $0 < g \leq 0.200$.

In addition, in the high-frequency dielectric ceramic compact described above, the primary crystalline phase is a perovskite crystal represented by the formula $Ba\{(Me_{1/3}Sb_{2/3})_{1-x}Ti_x\}O_3$, in which $0 < x \leq 0.4$, and Me comprises Mg or Mg and at least one of Zn, Ni and Co.

A dielectric resonator of the present invention comprises a dielectric ceramic, wherein the dielectric resonator is operated by electromagnetic coupling of the dielectric ceramic with an input and an output terminal, and the dielectric ceramic comprises the high-frequency dielectric ceramic compact described above.

A dielectric filter of the present invention comprises the dielectric resonator described above and external connector(s).

In addition, a dielectric duplexer of the present invention comprises at least two dielectric filters; input/output connectors in contact with each of the dielectric filters; and antenna connector commonly in contact with the dielectric filters; wherein at least one of the dielectric filters is the dielectric filter described above.

Furthermore, a communication apparatus of the present invention comprises the dielectric duplexer described above; a transmitting circuit in contact with at least one of the input/output connectors of the dielectric duplexers; a receiving circuit in contact with at least one of the input/output connectors except the input/output connector in contact with the transmitting circuit; and an antenna in contact with the antenna connector of the dielectric duplexer.

DESCRIPTION OF THE PREFERRED EMBODIMENTS

Figure 1:
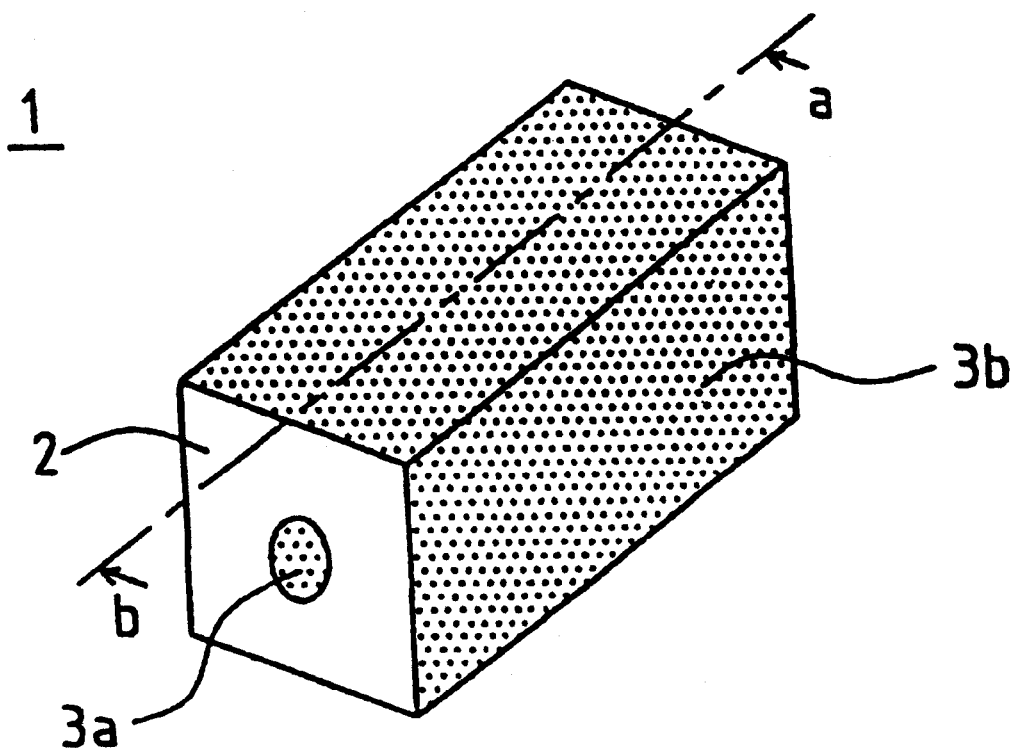
FIG. 1 is a perspective view showing an example of a dielectric resonator of the present invention.
Figure 2:
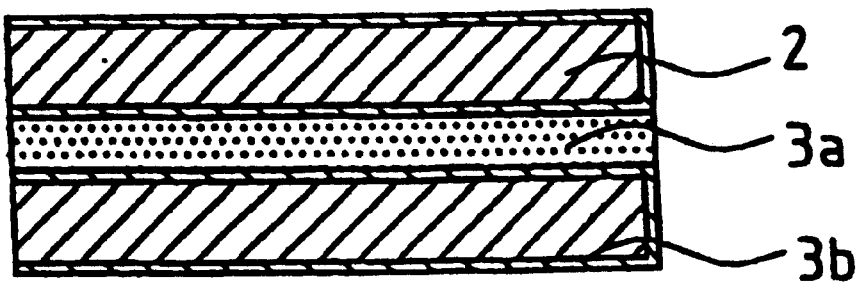
FIG. 2 is a cross-sectional view of the dielectric resonator shown in FIG. 1 taken along the line a-b.

FIG. 1 is a perspective view showing an example of a dielectric resonator of the present invention and FIG. 2 is a cross-sectional view of the dielectric resonator taken along the line a-b. As shown in FIGS. 1 and 2, a dielectric resonator 1 is composed of a prismatic dielectric ceramic 2 having a throughhole therein, an internal conductor 3a formed in the throughhole and an external conductor 3b formed on the periphery of the dielectric ceramic 2. When an input and an output terminal, that is, external couplers, are electromagnetically coupled with the dielectric ceramic 2, the dielectric resonator 1 is operated as a dielectric resonator. The dielectric ceramic 2 constituting the dielectric resonator 1 described above is formed of a high-frequency dielectric ceramic compact according to the present invention.

In FIG. 1, an example of the prismatic and TEM mode dielectric resonator is shown; however, the present invention is not limited thereto. The high-frequency dielectric ceramic compact of the present invention can also be applied to a dielectric resonator having a different shape, and to other TEM mode, TM mode and TE mode dielectric resonators.

Figure 3:
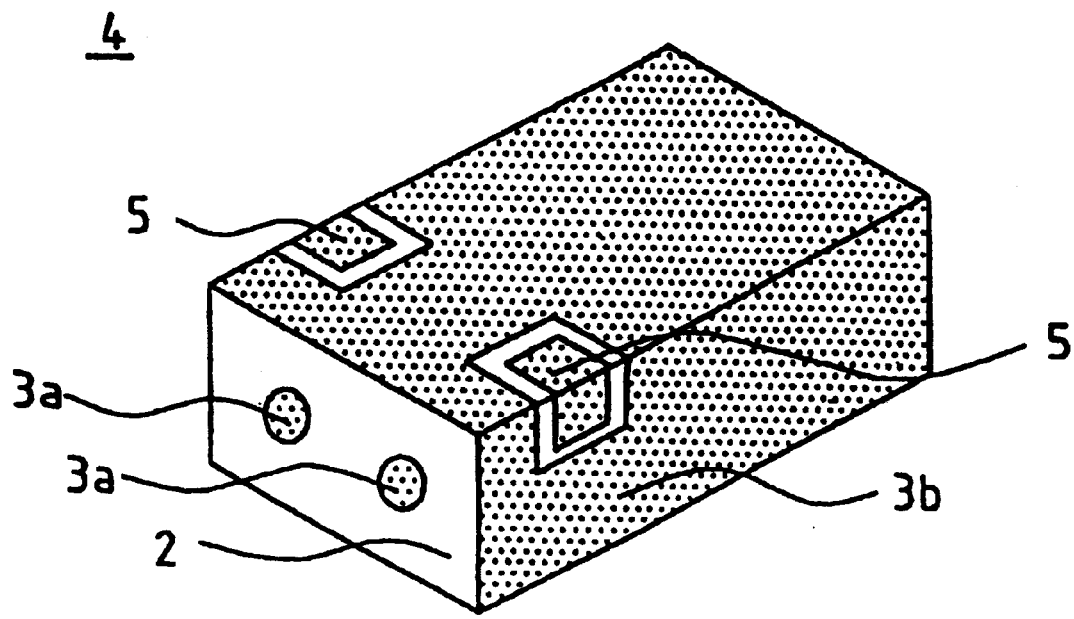
FIG. 3 is a perspective view showing an example of a dielectric filter of the present invention.

FIG. 3 is a perspective view showing an example of a dielectric filter of the present invention. As shown in FIG. 3, the dielectric filter 4 is composed of a dielectric resonator having a dielectric ceramic 2 provided with throughholes therein, internal conductors 3a and an external conductor 3b; and external coupler 5 provided for the dielectric resonator. In FIG. 3, a block type dielectric filter is shown; however, the dielectric filter of the present invention can also be a discrete type dielectric filter.

Figure 4:
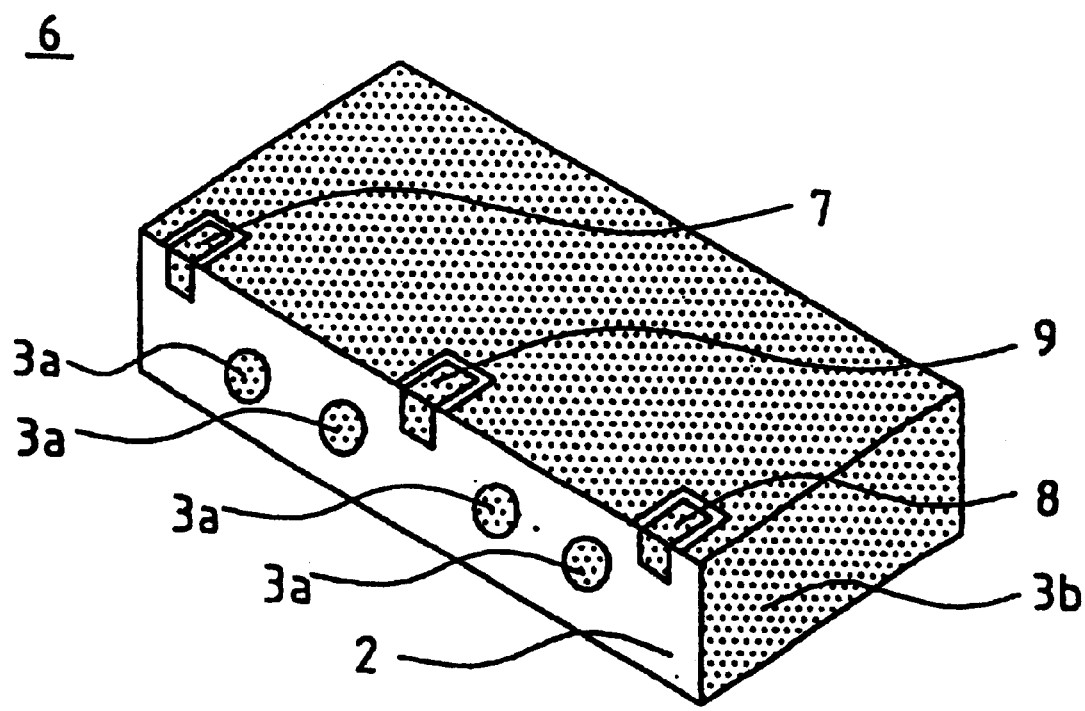
FIG. 4 is a perspective view showing an example of a dielectric duplexer of the present invention.

FIG. 4 is a perspective view showing an example of a dielectric duplexer of the present invention. As shown in FIG. 4, the dielectric duplexer 6 comprises two dielectric filters each composed of a dielectric resonator which has internal conductors 3a and an external conductor 3b, provided in a dielectric ceramic 2 having throughholes therein; input connector 7 in contact with one of the dielectric filters; output connector 8 in contact with the other dielectric filter; and antenna connector 9 commonly in contact with the dielectric filters. In FIG. 4, a block type dielectric duplexer is shown; however, the dielectric duplexer of the present invention can also be a discrete type dielectric duplexer.

Figure 5:
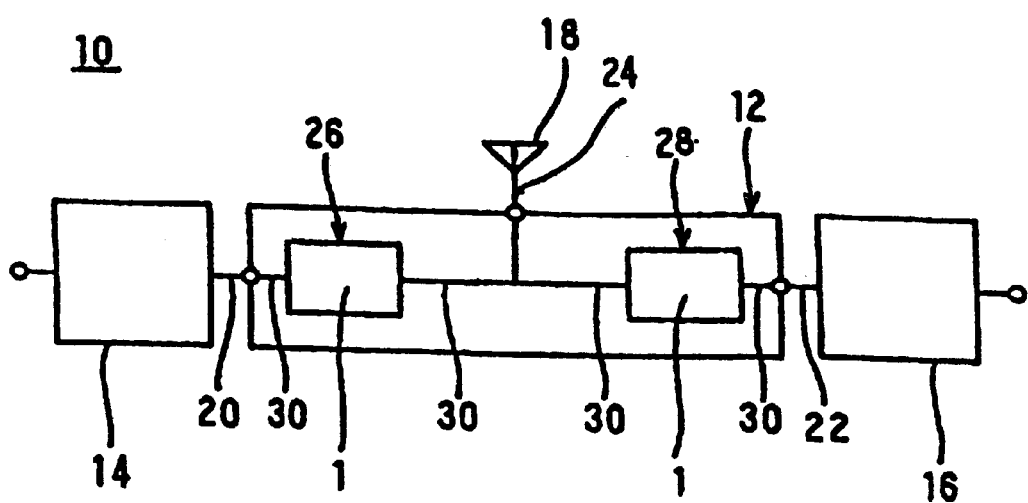
FIG. 5 is a block diagram showing an example of a communication apparatus of the present invention.

FIG. 5 is a block diagram showing an example of a communication apparatus of the present invention. The communication apparatus 10 comprises a dielectric duplexer 12, a transmission circuit 14, a receiving circuit 16 and an antenna 18. The transmission circuit 14 is in contact with input connector 20 of the dielectric duplexer 12, and the receiving circuit 16 is in contact with output connector 22 of the dielectric duplexer 12. In addition, the antenna 18 is in contact with antenna connector 24 of the dielectric duplexer 12. The dielectric duplexer 12 comprises two dielectric filters 26 and 28. The dielectric filters 26 and 28 are each formed of the dielectric resonator of the present invention in contact with external connectors. In this embodiment, for example, the dielectric filter is formed when external connectors 30 are connected to an input and an output terminal of the dielectric resonator 1. In addition, one dielectric filter 26 is in contact with the input connectors 20 and with the other dielectric filter 28, and the other dielectric filter 28 is in contact with said one dielectric filter 26 and with the output connection terminal 22.

The high-frequency dielectric ceramic compact of the present invention is not only applied to devices such as the dielectric resonators described above, but is also applied broadly to high-frequency devices, such as an dielectric antenna, an LC filter and a circuit substrate used in the microwave and millimeter wave regions.

EXAMPLES

Example 1

As starting materials, highly purified barium carbonate ($BaCO_3$), magnesium hydroxide ($Mg(OH)_2$), zinc oxide (ZnO), nickel oxide (NiO), cobalt carbonate ($COCO_3$) and antimony oxide ($Sb_2O_3$) were prepared.

The starting materials were weighed and mixed so as to obtain compacts represented by the formula $aBaO \cdot bMeO \cdot cSbO_{3/2}$ in accordance with the molar ratios shown in Table 1.

TABLE 1

Composition Formula: $aBaO \cdot bMeO \cdot cSbO_{3/2}$

| Sample | Me | BaO a | MeO b | $SbO_{3/2}$ c | $\epsilon_r$ | Q (at 1 GHz) | $\tau_f$ (ppm/°C.) |
|---|---|---|---|---|---|---|---|
| 1 | Mg | 0.500 | 0.167 | 0.333 | 14.4 | 64000 | 8.8 |
| 2 | Mg | 0.513 | 0.163 | 0.324 | 13.9 | 21000 | 2.5 |
| *3 | Mg | 0.515 | 0.160 | 0.325 | 14.0 | 7000 | −14.8 |
| *4 | Mg | 0.510 | 0.158 | 0.332 | 13.5 | 5000 | −12.0 |
| *5 | Mg | 0.503 | 0.174 | 0.323 | 13.7 | 6000 | −16.3 |
| 6 | Mg | 0.513 | 0.162 | 0.325 | 14.8 | 21000 | −3.2 |
| 7 | Mg | 0.488 | 0.171 | 0.341 | 15.2 | 21000 | 3.2 |
| 8 | Mg | 0.476 | 0.174 | 0.350 | 15.0 | 22000 | 0.8 |
| *9 | Mg | 0.478 | 0.170 | 0.352 | 14.8 | 5000 | −4.8 |
| *10 | Mg | 0.475 | 0.175 | 0.350 | 14.7 | 5000 | −5.6 |
| *11 | Mg | 0.480 | 0.178 | 0.342 | 18.9 | 5000 | −9.8 |
| 12 | 0.9Mg0.1Zn | 0.500 | 0.167 | 0.333 | 14.6 | 79000 | 8.4 |
| 13 | 0.8Mg0.2Zn | 0.500 | 0.167 | 0.333 | 14.8 | 76000 | 6.2 |
| 14 | 0.5Mg0.5Zn | 0.500 | 0.167 | 0.333 | 14.8 | 65000 | 7.2 |
| 15 | 0.2Mg0.8Zn | 0.500 | 0.167 | 0.333 | 14.9 | 55000 | 8.5 |
| 16 | 0.1Mg0.9Zn | 0.500 | 0.167 | 0.333 | 15.3 | 25000 | 9.3 |
| *17 | Zn | 0.500 | 0.167 | 0.333 | 16.8 | 17000 | 6.0 |
| 18 | 0.8Mg0.2Ni | 0.500 | 0.167 | 0.333 | 14.2 | 74000 | 7.6 |
| 19 | 0.6Mg0.4Ni | 0.500 | 0.167 | 0.333 | 12.7 | 67000 | 5.7 |
| 20 | 0.4Mg0.6Ni | 0.500 | 0.167 | 0.333 | 12.4 | 59000 | 6.1 |
| 21 | 0.2Mg0.8Ni | 0.500 | 0.167 | 0.333 | 12.1 | 54000 | 4.5 |
| 22 | 0.1Mg0.9Ni | 0.500 | 0.167 | 0.333 | 11.9 | 48000 | 3.2 |
| *23 | Ni | 0.500 | 0.167 | 0.333 | | Not Sintered | |
| 24 | 0.8Mg0.2Co | 0.500 | 0.167 | 0.333 | 15.2 | 76000 | 8.7 |
| 25 | 0.6Mg0.4Co | 0.500 | 0.167 | 0.333 | 13.7 | 69000 | 6.8 |
| 26 | 0.4Mg0.6Co | 0.500 | 0.167 | 0.333 | 13.4 | 61000 | 7.2 |
| 27 | 0.2Mg0.8Co | 0.500 | 0.167 | 0.333 | 13.1 | 55000 | 5.6 |
| 28 | 0.1Mg0.9Co | 0.500 | 0.167 | 0.333 | 12.8 | 44000 | 5.2 |
| *29 | Co | 0.500 | 0.167 | 0.333 | 11.0 | 11000 | 4.7 |

After the mixtures thus prepared were wet-mixed for 16 hours using a ball mill, dehydration, drying and calcining at 1,100 to 1,300° C. for 3 hours were performed. An appropriate amount of a binder was added to each calcined mixture, and wet pulverizing was again performed for 16 hours using a ball mill, thereby yielding powder mixtures.

Subsequently, after the powdered mixture was pressed at a pressure of 1,000 to 2,000 kg/cm² so as to form a disc shape, sintering was performed at 1,400 to 1,600° C. for 4 hours in air, thereby yielding a ceramic 10 mm in diameter and 5 mm thick, composed of a perovskite crystal as the primary crystalline phase.

For the ceramics thus formed, the relative dielectric constant ($\epsilon_r$) and the Q value were measured at measurement frequencies from 9 to 12 GHz using a short-circuit type dielectric resonator method, and the Q value obtained was converted to a Q value at 1 GHz in accordance with the fact Q×f=constant. In addition, the temperature coefficient ($\tau_f$, 25 to 55° C.) of the resonant frequency was measured from the TE01 mode resonant frequency. The results are shown in Table 1. In Table 1, the sample Nos. provided with asterisks * are outside the present invention, and all the other samples are within the present invention.

As can be seen from Table 1, the dielectric ceramic compacts of the present invention each had a high Q value of about 20,000 or more in the microwave region while maintaining a relative dielectric constant ($\epsilon_r$) of about 20 or less.

Referring to Table 1, the reasons for the limitations of the compact represented by the formula $aBaO \cdot bMeO \cdot cSbO_{3/2}$ according to the present invention will be described below.

First, the reason a is limited such that $0.476 \leq a \leq 0.513$ is that when a <0.476, as is the case of sample No. 10, and when a >0.513, as is the case of sample No. 3, the Q value is deceased to less than about 20,000, and as a result, the object of the present invention cannot be achieved.

The reason b is limited such that $0.160 \leq b \leq 0.175$ is that when b<0.160, as is the case of sample No. 4, and when b>0.175, as is the case of sample No. 11, the Q value is deceased to less than about 20,000.

The reason c is limited such that $0.324 \leq a \leq 0.350$ is that when c<0.324, as is the case of sample No. 5, and when c>0.350, as is the case of sample No. 9, the Q value is deceased to less than about 20,000.

As can be seen from the characteristics of the compacts of samples Nos. 12 to 29, represented by the formula $Ba(Me_{1/3}Sb_{2/3})O_3$ in Table 1, equivalent characteristics can be obtained when a part of the Mg content is replaced with at least one of Zn, Ni and Co. However, when 100% of Mg is replaced with Zn, Ni or Co, the Q value becomes less than about 20,000 as is the case of sample Nos. 17 and 29, or sintering cannot be performed as is the case of sample No. 23.

Example 2

As starting materials, highly purified barium carbonate ($BaCO_3$), magnesium hydroxide ($Mg(OH)_2$), zinc oxide (ZnO), nickel oxide (NiO), cobalt carbonate ($COCO_3$), antimony oxide ($Sb_2O_3$) and titanium oxide ($TiO_2$) were prepared.

The starting materials were weighed and mixed so as to obtain compacts represented by the formula $dBaO \cdot eMeO \cdot fSbO_{3/2} \cdot gTiO_2$ in accordance with the molar ratios shown in Table 2.

TABLE 2

Composition Formula: $dBaO \cdot eMeO \cdot fSbO_{3/2} \cdot gTiO_2$

| Sample | Me | BaO d | MeO e | SbO$_{3/2}$ f | TiO$_2$ g | $\epsilon_r$ | Q (at 1 GHz) | $\tau_f$ (ppm/° C.) |
|---|---|---|---|---|---|---|---|---|
| 30 | Mg | 0.476 | 0.175 | 0.339 | 0.010 | 15.0 | 22000 | 0.8 |
| 31 | Mg | 0.500 | 0.163 | 0.327 | 0.010 | 15.0 | 71000 | 6.5 |
| 32 | Mg | 0.478 | 0.163 | 0.349 | 0.010 | 13.3 | 31000 | 4.2 |
| *33 | Mg | 0.490 | 0.148 | 0.352 | 0.010 | 13.9 | 5000 | −10.2 |
| *34 | Mg | 0.500 | 0.178 | 0.312 | 0.010 | 13.6 | 8000 | −8.5 |
| 35 | Mg | 0.500 | 0.158 | 0.317 | 0.025 | 15.5 | 68000 | 4.2 |
| 36 | Mg | 0.500 | 0.155 | 0.310 | 0.035 | 15.8 | 69000 | 2.1 |
| 37 | Mg | 0.500 | 0.150 | 0.300 | 0.050 | 16.3 | 65000 | −0.1 |
| 38 | Mg | 0.500 | 0.142 | 0.283 | 0.075 | 16.9 | 68000 | −0.5 |
| 39 | Mg | 0.500 | 0.133 | 0.267 | 0.100 | 18.0 | 76000 | −3.1 |
| 40 | Mg | 0.500 | 0.125 | 0.250 | 0.125 | 18.3 | 72000 | −1.1 |
| 41 | Mg | 0.500 | 0.117 | 0.233 | 0.150 | 19.7 | 66000 | 0.4 |
| 42 | Mg | 0.500 | 0.100 | 0.200 | 0.200 | 20.0 | 59000 | 9.8 |
| *43 | Mg | 0.500 | 0.150 | 0.150 | 0.200 | 18.9 | 19000 | 6.4 |
| *44 | Mg | 0.500 | 0.050 | 0.250 | 0.200 | 17.8 | 18000 | 8.5 |
| *45 | Mg | 0.480 | 0.100 | 0.200 | 0.220 | 22.5 | 17000 | 50.3 |
| *46 | Mg | 0.500 | 0.083 | 0.167 | 0.250 | 41.4 | 4000 | 97.4 |
| *47 | Mg | 0.500 | 0.050 | 0.100 | 0.350 | 108.5 | 1000 | NM |
| *48 | Mg | 0.500 | 0.017 | 0.033 | 0.450 | | Not sintered | |
| *49 | Mg | 0.526 | 0.142 | 0.284 | 0.047 | 13.9 | 6000 | −18.0 |
| 50 | Mg | 0.513 | 0.146 | 0.292 | 0.049 | 15.1 | 22000 | −5.9 |
| 51 | Mg | 0.488 | 0.154 | 0.307 | 0.051 | 15.6 | 23000 | 1.8 |
| 52 | Mg | 0.476 | 0.157 | 0.314 | 0.052 | 15.3 | 23000 | −2.7 |
| *53 | Mg | 0.465 | 0.160 | 0.321 | 0.053 | 14.8 | 4000 | −6.4 |
| 54 | 0.9Mg0.1Zn | 0.500 | 0.150 | 0.300 | 0.050 | 16.5 | 75000 | 1.0 |
| 55 | 0.7Mg0.3Zn | 0.500 | 0.150 | 0.300 | 0.050 | 16.8 | 75000 | −0.2 |
| 56 | 0.5Mg0.5Zn | 0.500 | 0.150 | 0.300 | 0.050 | 17.1 | 74000 | 0.4 |
| 57 | 0.3Mg0.7Zn | 0.500 | 0.150 | 0.300 | 0.050 | 17.2 | 48000 | 0.6 |
| 58 | 0.1Mg0.9Zn | 0.500 | 0.150 | 0.300 | 0.050 | 17.4 | 35000 | −0.8 |
| *59 | Zn | 0.500 | 0.150 | 0.300 | 0.050 | 17.5 | 19000 | −2.6 |
| 60 | 0.9Mg0.1Ni | 0.500 | 0.150 | 0.300 | 0.050 | 16.3 | 65000 | 1.8 |
| 61 | 0.8Mg0.2Ni | 0.500 | 0.150 | 0.300 | 0.050 | 16.1 | 67000 | 1.1 |
| 62 | 0.5Mg0.5Ni | 0.500 | 0.150 | 0.300 | 0.050 | 15.8 | 72000 | 1.1 |
| 63 | 0.3Mg0.7Ni | 0.500 | 0.150 | 0.300 | 0.050 | 15.4 | 68000 | 0.9 |
| 64 | 0.1Mg0.9Ni | 0.500 | 0.150 | 0.300 | 0.050 | 15.2 | 45000 | 0.6 |
| *65 | Ni | 0.500 | 0.150 | 0.300 | 0.050 | | Not sintered | |
| 66 | 0.9Mg0.1Co | 0.500 | 0.150 | 0.300 | 0.050 | 15.3 | | |
| 67 | 0.8Mg0.2Co | 0.500 | 0.150 | 0.300 | 0.050 | 15.4 | 58000 | 0.3 |
| 68 | 0.5Mg0.5Co | 0.500 | 0.150 | 0.300 | 0.050 | 14.7 | 64000 | −0.2 |
| 69 | 0.3Mg0.7Co | 0.500 | 0.150 | 0.300 | 0.050 | 13.8 | 65000 | −1.1 |
| 70 | 0.1Mg0.9Co | 0.500 | 0.150 | 0.300 | 0.050 | 12.1 | 38000 | −2.1 |
| *71 | Co | 0.500 | 0.150 | 0.300 | 0.050 | 12.0 | 10000 | −3.0 |

Note: NM in the column of $\tau_f$ means not measurable.

Using these powdered mixtures in a manner similar to that in Example 1, ceramics 5 mm thick and 10 mm in diameter were obtained which were primarily composed of a perovskite crystal as the primary crystalline phase.

Subsequently, in a manner similar to that in Example 1, the relative dielectric constant ($\in_r$), the Q value and the temperature coefficient of the resonant frequency ($\tau_f$, 25 to 55° C.) were measured. The results are shown in Table 2. In Table 2, the samples provided with asterisks * are outside the present invention, and all the others are within the present invention.

As can be seen from Table 2, the dielectric ceramic compacts of the present invention had high a Q value of about 20,000 or more in the microwave region while maintaining a relative dielectric constant ($\in_r$) of about 20 or less.

As it is apparent from the results of sample Nos. 31 and 35 to 42, by changing the content ratio of $TiO_2$ in the compact, the temperature coefficient ($\tau_f$) of the resonant frequency can be optionally changed without degrading Q×f.

Referring to Table 2, the reasons for the limitations of the compact represented by the formula $dBaO \cdot eMeO \cdot fSbO_{3/2} \cdot gTiO_2$ according to the present invention will be described below.

First, the reason d is limited such that $0.476 \leq d \leq 0.513$ is that when d<0.476, as is the case of sample No. 53, and when d>0.513, as is the case of sample No. 49, the Q value is deceased to less than about 20,000, and as a result, the object of the present invention cannot be achieved.

The reason e is limited such that $0.100 \leq e \leq 0.175$ is that when e<0.100, as is the case of sample No. 44, and when e>0.175, as is the case of sample No. 34, the Q value is deceased to less than about 20,000.

The reason f is limited such that $0.200 \leq f \leq 0.349$ is that when f<0.200, as is the case of sample No. 43, and when f>0.349, as is the case of sample No. 33, the Q value is deceased to less than about 20,000.

The reason g is limited such that $0 < g \leq 0.200$ is that when g>0.200, as is the case of sample No. 45, the Q value is deceased to less than about 20,000, and in addition, the temperature coefficient ($\tau_f$) of the resonant frequency considerably deviates from nearly zero, such as 50 or more. In the range represented by $0 < g \leq 0.200$, by changing the amount of $TiO_2$, the temperature coefficient ($\tau_f$) of the resonant frequency can be freely controlled within the range of 0±10 (ppm/° C.).

As can be seen from the characteristics of the compacts of sample Nos. 54 to 71, represented by the formula $Ba\{(Me_{1/3}Sb_{2/3})_{0.9}Ti_{0.1}\}O_3$ in Table 2, equivalent characteristics can be obtained when a part of the Mg content is replaced with at least one of Zn, Ni and Co. However, when 100% of Mg is replaced with Zn, Ni or Co, the Q value becomes less than about 20,000 as is the case of sample Nos. 59 and 71, or sintering cannot be performed as is the case of sample No. 65.

In the high-frequency dielectric ceramic compact of the present invention, a small amount of an additive may be used as long as the objects of the present invention are not adversely influenced. For example, by adding $SiO_2$, $MnCO_3$, $B_2O_3$, $CuO$, $Li_2CO_3$ or $Al_2O_3$ in an amount of about 0.01 to 2 wt %, the sintering temperature can be decreased by 10 to 20° C. while suppressing the degradation of the characteristics. In addition, by adding $Nb_2O_5$, $Ta_2O_5$, $V_2O_5$, $WO_3$ or the like, in an amount of about 1 to 3 wt %, the relative dielectric constant and the temperature characteristics can be finely controlled, and hence, a superior high-frequency dielectric ceramic compact can be obtained.

As it is apparent from the above descriptions, a high-frequency dielectric ceramic compact according to the present invention can be obtained which has a low relative dielectric constant ($\in_r$) of about 20 or less and a high Q value of about 20,000 or more at 1 GHz, in which the temperature coefficient ($\tau_f$) can be optionally changed to about 0 (ppm/° C.).

Accordingly, by forming a dielectric resonator, a dielectric filter, a dielectric duplexer and a communication apparatus using a dielectric ceramic having the compact described above, superior characteristics can be obtained for individual devices mentioned above.

In addition, the high-frequency dielectric ceramic compact of the present invention can also be advantageously used as a material for dielectric antennas, LC filters and circuit substrates used in high frequency wave regions, such as microwaves and millimeter waves.

What is claimed is:

1. A high-frequency dielectric ceramic compact comprising Ba, Sb, Me and optionally Ti, in which Me comprises Mg or the combination of Mg and at least one of Zn, Ni and Co; and representing the compact the formula $aBaO \cdot bMeO \cdot cSbO_{3/2} \cdot gTiO_2$ on a molar basis then, $0.476 \leq a \leq 0.513$, $b \leq 0.175$, $0 \leq g \leq 0.200$, and either (a) g is 0, and $0.160 \leq b$ and $0.324 \leq c \leq 0.350$, or (b) 0<g, and $0.100 \leq b$ and $0.200 \leq c \leq 0.349$.

2. A high-frequency dielectric ceramic compact according to claim 1, wherein g is 0.

3. A high-frequency dielectric ceramic compact according to claim 2, wherein the primary crystalline phase of the high-frequency dielectric ceramic compact is a perovskite crystal represented by the formula $Ba(Me_{1/3}Sb_{2/3})O_3$.

4. A high-frequency dielectric ceramic compact according to claim 3, wherein Me is Mg.

5. A high-frequency dielectric ceramic compact according to claim 3, wherein Me is the combination of 90 to 10 m % Mg and 10 to 90 m % of at least one of Zn, Ni and Co.

6. A high-frequency dielectric ceramic compact according to claim 1, wherein g is greater than 0.

7. A high-frequency dielectric ceramic compact according to claim 6, wherein the primary crystalline phase of the high-frequency dielectric ceramic compact is a perovskite crystal represented by the formula $Ba\{(Me_{1/3}Sb_{2/3})_{1-x}Ti_x\}O_3$, in which $0 < x \leq 0.4$.

8. A high-frequency dielectric ceramic compact according to claim 7, wherein Me is Mg.

9. A high-frequency dielectric ceramic compact according to claim 7, wherein Me is the combination of 90 to 10 m % Mg and 10 to 90 m % of at least one of Zn, Ni and Co.

10. A dielectric resonator comprising a dielectric ceramic electromagnetically coupled with an input and an output terminal, in which the dielectric ceramic comprises a high-frequency dielectric ceramic compact according to claim 7.

11. A dielectric filter comprising a dielectric resonator according to claim 10 in combination with an external connector.

12. A dielectric duplexer comprising at least two dielectric filters, first and second input/output connection terminals in contact with the dielectric filters; and an antenna connection terminal in contact with both dielectric filters; wherein at least one of the dielectric filters is a dielectric filter according to claim 11.

13. A communication apparatus comprising a dielectric duplexer according to claim 12; a transmitting circuit in contact with the first input/output connection terminal of the dielectric duplexer; a receiving circuit in contact with the second input/output connection terminal; and an antenna in contact with the antenna connection terminal of the dielectric duplexer.

14. A dielectric resonator comprising a dielectric ceramic electromagnetically coupled with an input and an output terminal, in which the dielectric ceramic comprises a high-frequency dielectric ceramic compact according to claim 3.

15. A dielectric filter comprising a dielectric resonator according to claim 14 in combination with an external connector.

16. A dielectric duplexer comprising at least two dielectric filters, first and second input/output connection terminals in contact with the dielectric filters; and an antenna connection terminal in contact with both dielectric filters; wherein at least one of the dielectric filters is a dielectric filter according to claim 15.

17. A communication apparatus comprising a dielectric duplexer according to claim 16; a transmitting circuit in contact with the first input/output connection terminal of the dielectric duplexer; a receiving circuit in contact with the second input/output connection terminal; and an antenna in contact with the antenna connection terminal of the dielectric duplexer.

18. A dielectric resonator comprising a dielectric ceramic electromagnetically coupled with an input and an output terminal, in which the dielectric ceramic comprises a high-frequency dielectric ceramic compact according to claim 1.

19. A dielectric filter comprising a dielectric resonator according to claim 18 in combination with an external connector.

20. A dielectric duplexer comprising at least two dielectric filters, first and second input/output connection terminals in contact with the dielectric filters; and an antenna connection terminal in contact with both dielectric filters; wherein at least one of the dielectric filters is a dielectric filter according to claim 19.

21. A communication apparatus comprising a dielectric duplexer according to claim 20, a transmitting circuit in contact with the first input/output connection terminal of the dielectric duplexer; a receiving circuit in contact with the second input/output connection terminal; and an antenna in contact with the antenna connection terminal of the dielectric duplexer.

* * * * *